Patented Apr. 7, 1931

1,799,324

UNITED STATES PATENT OFFICE

GEORGE H. A. RUBY, OF GRAND RAPIDS, MICHIGAN

PLASTER MIXTURE

No Drawing.  Application filed May 18, 1928.  Serial No. 278,913.

This invention relates to compositions or mixtures of which calcined gypsum (plaster of Paris) is the principal ingredient, and more particularly to the use of such mixtures in the manufacture of building products such as partition blocks or tile, floor, roof and ceiling blocks or slabs, plaster board, wall board, and for use as what is termed "gypsum fibre concrete" in poured-in-place floor, roof and ceiling construction, walls and partitions.

Manufactures of this character have in the past been made of calcined gypsum combined with various fibrous aggregates or fillers intended to improve the physical characteristics of the finished block or slab, to increase the bulk, and lighten the weight. Heretofore, the material generally used for this aggregate or filler has been wood shavings, wood fibre or sawdust. When used in any appreciable percentage, however, these aggregates, containing relatively large amounts of sap or resinous substances, have resulted in a serious discoloration of the exposed surface of the block, slab, etc., leaving an unsightly finish. In many cases, even the application of several coats of paint, fails to hold back this stain. Moreover, the supply of wood shavings, sawdust, etc., is becoming uncertain, due to the growth in this and other uses for same, as well as to the fact that the supply is seasonal, since planing mills do not operate at a uniform rate of production throughout the year.

In the past, short fibre asbestos was employed for this purpose for a short time, or until experience developed that the mixture of gypsum and asbestos, in the presence of water, resulted in a chemical reaction producing magnesium sulphate. This magnesium sulphate being soluble, was carried by the water in the block or slab to the exposed surface, and the water evaporating, left a crystalline deposit which would flake and fall upon objects below. This efflorescence continues as long as there is any moisture in the slab or block, and after having apparently ceased, will again recur if the slab absorbs moisture from exposure to saturated air.

The present invention is intended to obviate all of the difficulties enumerated above and to produce an improved gypsum mixture containing a filling material avoiding all of the disadvantages of those heretofore employed.

In practice, I have found that cotton, such as cotton batting, linters, and the like, is eminently suitable as a fibre, binder or aggregate in gypsum mixtures. Although cotton, per unit of weight, is more expensive than wood shavings, wood fibre, sawdust, etc., I have found that the weight of cotton necessary to impart to the block or slab the desired properties, is so small in proportion to the weight of any of these other ingredients necessary to produce an equivalent result, that the use of cotton becomes equally, if not more, economical. By the use of cotton in a gypsum mixture, I obtain a block, slab or board which is strong, tough, not easily broken, and will hold nails firmly without splitting or spalling. Cotton linters have the property of matting, that is, of tending to form a mat due to the fibers hooking and joining together. When used with calcined gypsum and thoroughly mixed therewith they form a body in the gypsum to which the same adheres after it has hardened and set while said matted body of cotton linters in the hardened and set gypsum interlocked with the gypsum and matted together, provides properties of toughness, increased flexibility and strength, decrease of weight, and furnishes a body which will securely hold nails as previously described.

A moulded gypsum product made with cotton fibres in place of wood, has the advantage of eliminating the discoloration of the surfaces from the resinous substances in the wood.

I have found that the amount of cotton fibre which may be added to the calcined gypsum, may be varied widely to produce various desired results. I may use as little as ten or fifteen percent, by weight, of the amount of wood shavings or fibre previously used and yet obtain, after setting and hardening, a block, slab or board considerably lighter, stronger and tougher, than if made with the greater quantity of wood fibre. The resulting cost of the finished product by the use of the cotton fibre is therefore, less than the cost of the wood fibre or shavings, even though the price per pound paid for the cotton fibre may be four or five times that paid for the wood fibre or shavings.

While the proportion of cotton, by weight, which may be used with calcined gypsum in mixtures of this kind is limited (as an excess of fibre will decrease the strength of the resulting product), experience has shown that for certain products it is practicable to use as much as 25 per cent of cotton fibres, of the total weight of the gypsum and fibre.

Mixtures of the kind referred to may be prepared in any suitable manner; for example, I may thoroughly mix the dry calcined gypsum with the desired quantity of cotton fibres, either in the form of linters, batting, short fibres obtained from mill waste, or by chopping up long fibres or batting, and then mix the two ingredients thoroughly while dry, either by hand or in a suitable mechanical mixer. I may then add sufficient water, agitate and mix the mass until a proper consistency is obtained. Then the wet mixture may be spread or troweled upon the surface and allowed to set, or may be poured into suitable forms or moulds to produce blocks, slabs, boards or poured-in-place floor or roof slabs. Ordinarily I use only the two ingredients mentioned to which water is added; obviously, however, there may also be added to the mixture filling materials, coloring matter, substances to accelerate or retard the setting time of the material, etc., in accordance with ordinary practice in the art.

Although I have described my invention generally, giving a single specific example of the operation thereof, my invention is not limited to the said specific example, but is to be considered as of broad scope, as specified in the claims appended hereto.

What I claim is:

1. A hardened mass in which the binder consists of plaster of Paris and the filler consists of cotton fibers, which has been solidified through crystallization after the addition of water, said mass being strong, tough, not easily broken, and capable of holding nails firmly without splitting or spalling.

2. A mass of hardened material in which the binder consists of plaster of Paris and the filler consists of not more than 25% of cotton fibers, the mass being solidified through crystallization after the addition of water, the mass being strong, tough, not easily broken, and capable of holding nails firmly without splitting or spalling.

3. A hardened mass in which the binder consists of plaster of Paris and the filler consists of not more than 10% cotton fibers, the mass being solidified through crystallization after the addition of water, the mass being strong, tough, not easily broken, and capable of holding nails firmly without splitting or spalling.

4. A hardened mass in which the binder consists of plaster of Paris and the filler consists of not more than 5% cotton fibers, the mass being solidified through crystallization after the addition of water, the mass being strong, tough, not easily broken, and capable of holding nails firmly without splitting or spalling.

5. A hardened mass in which the binder consists of plaster of Paris and the filler consists of from 1% to 5% cotton fibers, the mass being solidified through crystallization after the addition of water, the mass being strong, tough, not easily broken, and capable of holding nails firmly without splitting or spalling.

In testimony whereof, I have hereunto subscribed my name this 15th day of May, 1928.

GEORGE H. A. RUBY.